(12) United States Patent
Avidan et al.

(10) Patent No.: US 7,657,028 B2
(45) Date of Patent: *Feb. 2, 2010

(54) METHOD FOR CLASSIFYING PRIVATE INFORMATION SECURELY

(75) Inventors: Shmuel Avidan, Brookline, MA (US); Ariel Elbaz, New York, NY (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 757 days.

This patent is subject to a terminal disclaimer.

(21) Appl. No.: 11/246,764

(22) Filed: Oct. 7, 2005

(65) Prior Publication Data

US 2007/0081664 A1 Apr. 12, 2007

(51) Int. Cl.
*H04L 9/00* (2006.01)
(52) U.S. Cl. .......................... 380/28; 380/29; 380/30; 713/189; 708/490
(58) Field of Classification Search .............. 380/286, 380/44, 277, 28, 282, 118, 29, 30; 713/171, 713/156, 155; 708/490
See application file for complete search history.

(56) References Cited

U.S. PATENT DOCUMENTS

2007/0053507 A1* 3/2007 Smaragdis et al. ............ 380/28

OTHER PUBLICATIONS

Yoav Freund, Robert E. Schapire; "A Short Introduction to Boosting", Sep. 1999; Journal of Japanese Society for Artificial Intelligence.*

(Continued)

*Primary Examiner*—Taghi Arani
*Assistant Examiner*—Mohammad L Rahman
(74) *Attorney, Agent, or Firm*—Dirk Brinkman; Gene Vinokur

(57) ABSTRACT

A method for securely classifying private data x of a first party Alice using a classifier H(x) of a second party Bob. The classifier is $$H(x) = \text{sign}\left(\sum_{n=1}^{N} h_n(x)\right),$$

where $$h_n(x) = \begin{cases} \alpha_n & x^T y_n > \Theta_n \\ \beta_n & \text{otherwise} \end{cases}, \alpha_n, \beta_n$$

and $\Theta_n$ are scalar values and $y_n$ is a vector storing parameters of the classifier. Bob generates a set of N random numbers, $S_1, \ldots, S_N$, such that $$s = \sum_{n=1}^{N} s_n,$$

for each $n=1, \ldots, N$, the following substeps are performed: applying a secure dot product to $x^T y_n$ to obtain $a_n$ for Alice and $b_n$ for Bob; applying a secure millionaire protocol to determine whether $a_n$ is larger than $\Theta_n - b_n$, and returning a result of $a_n + S_n$, or $\beta_n + S_n$; accumulating, by Alice, the result in $c_n$. Then, apply the secure millionaire protocol to determine whether $$c = \sum_{n=1}^{N} c_n$$

is larger than $$s = \sum_{n=1}^{N} s_n,$$

and returning a positive sign if true, and a negative sign if false to classify the private data x.

6 Claims, 5 Drawing Sheets

OTHER PUBLICATIONS

Andrew C. Yao, "Protocols for Secure Computations", 1982, IEEE.*

N.N. Aizanberg, Yu. L. Ivaskiv, D.A. Pospelov, G.F. Khudyakov; "Multi-Valued Threshold Functions", Jul.-Aug. 1971;Kibernetika.*

Y.C. Chang; C.J. Lu "Oblivious polynomial evaluation and oblivious neural learning"; Springer-Verlag, 2001; AsiaCrypt:Advances in Cryptology.*

Wikipedia (http://en.wikipedia.org/wiki/Sigmoid_function)—Sigmoid Function.*

Wikipedia (hrrp://en.wikipedia.org/wiki/K-nearest_neighbor_algorithm)—K-nearest neighbor (k-nn) algorithm.*

*Yoav Freund, Robert E. Schapire; "A Short Introduction to Boosting", Sep. 1999; Journal of Japanese Society for Artificial Intelligence.*

Wikipedia (http://en.wikipedia.org/wiki/Sigmoid_function)—Sigmoid Function, Cited as known concept, updated in wikipedia, Jan. 24, 2004 (Wayback machine).*

Wikipedia (hrrp://en.wikipedia.org/wiki/K-nearest_neighbor_algorithm)—K-nearest neighbor (k-nn) algorithm, cited as known concept, updated in wikipedia , Dec. 2005.*

Y.C. Chang and C.J. Lu. *Oblivious polynomial evaluation and oblivious neural learning.* In AsiaCrypt: Advances in Cryptology. LNCS, Springer-Verlag, 2001.

B. Chor, O. Goldreich, E. Kushilevitz and M. Sudan. *Private Information Retrieval.* FOCS, 1995.

S. Even, O. Goldreich and A. Lempel, *A Randomized Protocol for Signing Contracts*, Communications of the ACM 28, pp. 637-647, 1985.

E. Kushilevitz and R. Ostrovsky. *Replication Is Not Needed: Single Database, Computationally-Private Information Retrieval.* FOCS 1997.

Y. Lindell and B. Pinkas, *Privacy preserving data mining.* In Advances in Cryptology—Crypto2000, LNCS 1880, 2000.

M. Naor and B. Pinkas, *Oblivious Polynomial Evaluation.* In Proc. of the 31st Symp. on Theory of Computer Science (STOC), Atlanta, GA, pp. 245-254, May 1-4, 1999.

M. Naor and B. Pinkas, *Efficient Oblivious Transfer Protocols.* In Proc. of the twelfth annual ACM-SIAM symposium on Discrete algorithms , Washington, D.C., USA pp. 448-457, 2001.

Avidan S et al.; "Blind Vision"; Computer Vision- ECCV 2006, 9th European Conference on Computer Vision. Proceedings, Part III. Lecture Notes in Computer Science, Springer-Verlag, vol. 3953, May 13, 2006 pp. 1-13.

* cited by examiner

For each point $y_i$, Alice and Bob perform the following sub steps (a) Alice and Bob obtain private shares $a$ and $b$ of the dot product $(-2x)^T y$ (b) Bob defines $s_B = b + y^T y$ and a function $f(z) = z + s_B$ (c) Alice and Bob use OPE to evaluate $s_A = f(x^T x + a)$, where $s_A$ is a private share of Alice (d) Bob selects $u_i$ at random (e) Alice and Bob compare $s_A - r_A$ to $r_B - s_B$ using the millionaire protocol. This is equivalent to comparing the squared Euclidean distance $d(x, y_i)$ to the radius $r$. If $s_A - r_A < r_B - s_B$ AND $c(y_i) = 1$, then Bob returns $u_i + 1$, otherwise Bob returns $u_i$. Alice stores the result in $v_i$.

Alice and Bob determine $v = \sum_{i=1}^{N} v_i$, and $u = \sum_{i=1}^{N} u_i$, respectively.

Alice and Bob compare $v$ and $u + k/2$ using the millionaire protocol. If $v > u + k/2$, then $x$ is labeled 1, otherwise the label is 0.

*Fig. 5*

METHOD FOR CLASSIFYING PRIVATE INFORMATION SECURELY

FIELD OF THE INVENTION

This invention relates generally to cooperative computing, and more particularly to performing cooperative computing in a secure manner using encryption techniques to classify private information.

BACKGROUND OF THE INVENTION

The Internet provides opportunities for cooperative computing. With cooperative computing, users and providers can exchange goods, services, and information. The Internet can also provide access to a classifier that can be used to classify data or signals.

Data classification in general is well known in the art. Of particular interest are binary classifiers. Such classifiers simply give a 'yes' or 'no' answer to indicate whether particular data belongs to a particular class or not.

Specifically, binary classification is the task of classifying objects into two groups on the basis of whether they have some predetermined property or not. Typical binary classification tasks include face recognition in images, medical testing of clinical data, and quality control of products. Generally, computer implemented classifiers automatically 'learn' a classification system. Well known methods suitable for learning binary classifiers include decision trees, Bayesian networks, support vector machines (SVM), and neural networks.

Private information classification (PIC) enables two parties, for example, Alice and Bob, to engage in a protocol that allows Alice to classify data using Bob's classifier without revealing anything to Bob (not even the classification result) and without learning anything about Bob's classifier, other than an answer to a classification request. PIC brings together the fields of machine learning and cooperative, multi-party computing, which is a sub-field of cryptography.

Secure multi-party computation is described by Yao, "*How to generate and exchange secrets,*" 27th FOCS, pp. 162-167, 1986. That gave a solution to a general two party problem. As a concrete example, consider the well known 'millionaire problem'. Two parties want to find who has a larger number without revealing anything else about the numbers themselves.

Goldriech et al. extended the solution to n>2 parties, some of whom might be cheating, O. Goldreich, S. Micali and A. Wigderson, "*How to play any mental game—a completeness theorem for protocols with honest majority,*" 19th ACM Symposium on the Theory of Computing, pp. 218-229, 1987.

However, the original theoretical construct was too demanding to be of practical use. An introduction to Cryptography is given by B. Schneier, in *Applied Cryptography*, 1996, and a more advanced and theoretical treatment is given by O. Goldreich, in *Foundations of Cryptography*, 2004.

Since then, many secure protocols have been described for various applications. Relevant to the present invention are secure dot-products and oblivious polynomial evaluation, learning decision trees, and private information retrieval (PIR), Y. C. Chang and C. J. Lu, "*Oblivious polynomial evaluation and oblivious neural learning,*" AsiaCrypt: Advances in Cryptology. LNCS, Springer-Verlag, 2001; B. Chor, O. Goldreich, E. Kushilevitz and M. Sudan, *Private Information Retrieval*," FOCS, 1995; Y. Lindell and B. Pinkas, "*Privacy preserving data mining*" Advances in Cryptology—Crypto2000, LNCS 1880, 2000; and M. Naor and B. Pinkas, "*Oblivious Polynomial Evaluation,*" Proc. of the 31st Symp. on Theory of Computer Science (STOC), pp. 245-254, May 1-4, 1999.

In a secure dot product, Alice and Bob respectively determine a dot-product of their private data vectors without revealing anything other than the result to each other. In some variants of the dot product protocol, Alice obtains the sum of the dot-product and some random number that is known only to Bob, while Bob learns nothing. This serves as a building block for more complex protocols.

In oblivious polynomial evaluation (OPE), Bob has a polynomial P(x) and Alice has a particular value x. Alice evaluates the polynomial at the value x without letting Bob know the value x. Bob does so, without revealing the polynomial.

The OPE has also been used for learning a decision tree where the training data are held by two parties. The parties want to jointly learn a decision tree without revealing their private data to each other. In the end, each party learns the decision tree that was trained using the combined data, but the private data of one party is not revealed to the other party.

PIC is an extension of private information retrieval (PIR). In PIR, Alice is interested in retrieving a data item from Bob's database without letting Bob know which element Alice selected. For example, Bob has a database of stock quotes and Alice would like to obtain the quote of a particular stock without letting Bob know which stock Alice selected. Bob is willing to let her do so. However, Bob wants to ensure that Alice can access one, and only one, stock quote.

A number of ways are known for reducing the communication and computation resources required by PIR, A. Beimel, Y. Ishai, E. Kushilevitz, and J.-F. Raymond, "*Breaking the O(n1/(2k−1)) Barrier for Information—Theoretic Private Information Retrieval,*" FOCS, 2002 and E. Kushilevitz and R. Ostrovsky, "*Replication Is Not Needed: Single Database, Computationally-Private Information Retrieval,*" FOCS 1997.

SUMMARY OF THE INVENTION

The invention provides a method for securely classifying private data x of a first party using a classifier H(x) of a second party. The classifier is $$H(x) = \text{sign}\left(\sum_{n=1}^{N} h_n(x)\right),$$

where $$h_n(x) = \begin{cases} \alpha_n & x^T y_n > \Theta_n \\ \beta_n & \text{otherwise} \end{cases}; \alpha_n, \beta_n,$$

and $\Theta_n$ are scalar values; and $y_n$ is a vector storing parameters of the classifier.

The second party generates a set of N random numbers: $s_1, \ldots, s_N$, such that $$s = \sum_{n=1}^{N} s_n.$$

For each n=1, ..., N, the following substeps are performed: applying a secure dot product to $x^T y_n$ to obtain $a_n$ for the first party and $b_n$ for the second party; applying a secure millionaire protocol to determine whether $a_n$ is larger than $\Theta_n - b_n$, returning a result of $a_n + s_n$ or $\beta_n + s_n$, and accumulating, by the first party, the result in $c_n$.

Then, the secure millionaire protocol is applied to determine whether $$c = \sum_{n=1}^{N} c_n$$

is larger than $$s = \sum_{n=1}^{N} s_n$$

which returns a positive sign if true and a negative sign if false to classify the private data x.

BRIEF DESCRIPTION OF THE DRAWINGS

FIG. 5 is a chart of the pseudo-code for classifying private data using a secure k-nn kernel classifier according to an embodiment of the invention.

DETAILED DESCRIPTION OF THE PREFERRED EMBODIMENTS

Figure 1:
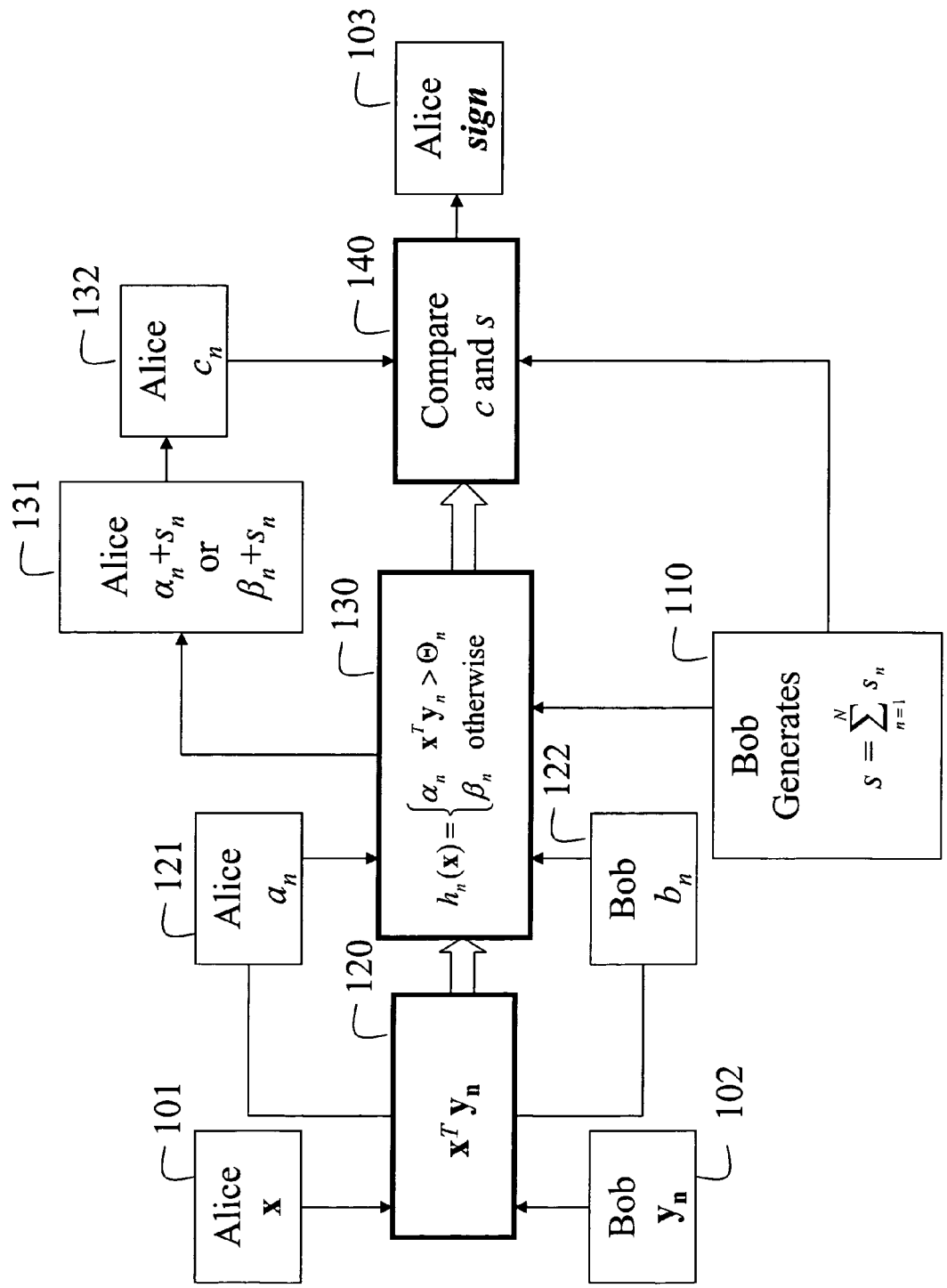
FIG. 1 is a flow diagram for classifying private data using a secure threshold classifier according to an embodiment of the invention.

A first party, e.g., Alice, has a private data vector x, and a second party, e.g., Bob, has a trained 'strong' classifier, in the form of a function H(x). Typically, the strong classifier is a linear combination of weak classifiers $h_n(x)$, see Y. Freund and R. E. Schapire, "*A short introduction to boosting*," Journal of Japanese Society for Artificial Intelligence, 14(5), pp. 771-780, September 1999, incorporated herein by reference.

Alice and Bob would like to engage in a secure protocol that allows Bob to classify Alice's data vector x. In particular, both parties evaluate a classification function:

$$H(x) = \text{sign}\left(\sum_{n=1}^{N} h_n(x^T y_n)\right), \quad (1)$$

using cryptographic tools, where the vector $x \in F^L$ and vectors $\{y_n\}_{n=1}^{N}$, where $y_n \in F^L$ are L-dimensional vectors over a finite field F. The notation $x^T y_n$ is a dot product, as known in the art.

The vector $y_n$ stores parameters of the classification function. Bob 'learns' the parameters $y_n$ using conventional mechanisms for training a classifier for a particular classification task, such as data recognition and, in particular, face recognition in images or sound recognition in an audio signal. It is well known how to classify data and how to train classifiers for various tasks.

Alice has the private data x, and Bob has the parameters (N, $h_n()$ and $y_n$). Eventually, Alice learns sign(H(x)) and nothing else, and Bob learns nothing about the Alice's private data vector x.

Specifically, we describe how to evaluate the following forms of the classification function $h(x^T y)$ in a secure manner.

A threshold classification function, $$h_n(x) = \begin{cases} \alpha_n & x^T y_n > \Theta_n \\ \beta_n & \text{otherwise,} \end{cases}$$

where $\alpha$ and $\beta$ and $\Theta$ are scalar values, e.g., 1 and 0, that are learned by Bob during training.

A polynomial classification function, $h(x^T y) = (x^T y + c)^d$, where c and d are scalar values known only to Bob.

A Gaussian classification function, $h(x^T y) = \exp(\gamma \|x - y\|_2^2)$, where $\gamma$ is a scalar value known only to Bob.

A sigmoid classification function, $h(x^T y) = 1/(1 + \exp(x^T y))$.

Note that the Gaussian function and sigmoid function can be approximated with a polynomial function. Here, we describe how to securely evaluate the Gaussian and sigmoid functions directly. In addition we describe how to construct a secure k-nn classifier.

First, we describe preliminary notations and some well known sub-protocols, and then we describe various secure classifiers H according to the embodiments of the invention.

Oblivious Polynomial Evaluation Protocol

We use the well known oblivious polynomial evaluation (OPE) protocol, see Y. C. Chang and C. J. Lu, "*Oblivious polynomial evaluation and oblivious neural learning*," Asia-Crypt: Advances in Cryptology. LNCS, Springer-Verlag, 2001, incorporated herein by reference, and M. Naor and B. Pinkas, "*Oblivious Polynomial Evaluation*," Proc. of the 31st Symp. on Theory of Computer Science (STOC), pp. 245-254, May 1-4, 1999, incorporated herein by reference.

Oblivious Transfer Protocol

An oblivious transfer (OT) enables Alice to select one element from a database of elements that Bob holds without revealing to Bob which element was selected, and without learning anything about the other elements in the database. The oblivious transfer protocol was described by Even et al. as a generalization of Rabin's 'oblivious transfer', S. Even, O. Goldreich and A. Lempel, "*A Randomized Protocol for Signing Contracts*," Communications of the ACM 28, pp. 637-647, 1985, incorporated herein by reference, and M. O. Rabin, "*How to exchange secrets by oblivious transfer*," Tech. Memo TR-81, Aiken Computation Laboratory, 1981, incorporated herein by reference.

For example, Bob has private elements $M_0$ and $M_1$, and Alice wants to select one of the elements without letting Bob know which element Alice selected. Bob is willing to let her do so provided that Alice does not learn anything about the other elements. The following protocol, based on RSA encryptions, can be used to solve the problem.

1. Bob sends Alice two different public encryption keys $K_0$ and $K_1$.

2. Alice generates a private key K, and encrypts her private key K with either of Bob's public encryption keys $K_0$ or $K_1$. For this example, Alice uses Bob's public key $K_0$. Alice sends Bob $E(K, K_0)$, where $E(K, K_0)$ denotes the encryption of Alice's private key by Bob's public key.

3. Bob does not know which public key was used by Alice to encrypt her private key. Therefore, Bob decrypts $E(K, K_0)$ with both of his private keys. Thus, he obtains both the real key K and an erroneous key K'.

4. Bob sends Alice encryptions $E(M_0, K)$ and $E(M_1, K')$. Alice decrypts the first of these messages with her private key K and obtains $M_0$.

Secure Dot Product Protocol

Before describing the details of the well known dot product protocol, we give an intuitive introduction. The goal is to partition a result of the dot product operation $x^T y$ into two shares a and b, where the share a is known only to Alice, and the share b is known only to Bob.

The dot product holds that $x^T y = a+b$. We do this by breaking the product of every pair of elements $x_i * y_i$ into two shares $a_i$ and $b_i$, and then letting Alice and Bob sum the vectors a and b, respectively to obtain shares of the dot product. The protocol is described below.

Input: Alice has the vector x and Bob has the vector y.

Output: Alice and Bob have shares a and b, such that $a+b=x^T y$.

1. Bob generates a random vector $b \in F^L$.
2. For each i=1, ..., L, Alice and Bob perform the following sub-steps:
   (a) Bob constructs a |F|-dimensional vector a, for all possible values of element $x_i$ such that $a_i = x_i * y_i - b_i$
   (b) Alice uses the $OT_1^{|F|}$ with $x_i$ as an index to select an element from the vector a. Alice stores the result in $a_i$.
3. Alice and Bob sum their private vectors a and b, respectively, to obtain the shares a and b of the dot-product $x^T y$.

Secure Millionaire Protocol

Alice and Bob would like to determine who has a larger number without revealing anything else about their numbers, see A. C. Yao, "How to generate and exchange secrets," 27th FOCS, pp. 162-167, 1986, incorporated herein by reference. The millionaire protocol uses the OT protocol. The idea is to have Alice and Bob represent their numbers in a binary format, scan the binary numbers, one bit at a time, from the most significant bit to the least significant bit, and then obtain the result.

For each bit, Bob prepares a lookup table that is based on his current bit value and two possible bit values of Alice. Alice uses $OT_1^2$ to obtain some intermediate result, and both Alice and Bob continue to the next bit.

To solve the millionaire problem, we use a state variable s that can take one of three states:
1—Alice has a larger number,
2—Bob has a larger number, or
3—Undecided.

For each bit, Bob constructs a six-way lookup table that includes the three states of s and the two possible values of the next bit of Alice's number. An output is a next state after evaluating the current bit.

For example, if s=1 (Alice has a larger number), Bob's current bit is 1, and Alice's current bit is 0, then the output state is s=1 because Alice has the larger number, and Alice and Bob move to the next bit.

To prevent Alice from interpreting the state s, Bob can use a different permutation for each bit. For example, for the first bit, s=1 means that Alice has the larger number, but for the second bit, s=1 might mean that Bob has the larger number. The details are described below.

Input: Alice and Bob have non-negative numbers x and y, respectively.

Output: Alice and Bob learn if x>y without revealing the numbers x or y.

1. Bob defines three states {A, B, U} that correspond respectively to: Alice has a larger number, Bob has a larger number, and undecided. For each bit, Bob encodes {A, B, U} using a different permutation of the numbers {1, 2, 3}.
2. For the left most bit, Bob constructs a two-entry lookup table $z^{(n)}$, such that

|         | $y_n = 0$ | $y_n = 1$ |
|---------|-----------|-----------|
| $x_n = 0$ | U         | B         |
| $x_n = 1$ | A         | U         | where $y_n$ is the most significant bit of the number y. If $y_n=0$, then Bob should choose the left column, otherwise he should use the right column.

3. Alice uses $OT_1^2$ with $x_n$ as an index to obtain $s^{(n)} = z^{(n)}(x_n)$.
4. For each i=n-1, ..., 1, Alice and Bob conduct the following sub-steps:
   (a) Bob constructs a 6-entry lookup table $z^{(i)}$ that is indexed by $s^{(i)}$ and $x_i$, such that

|                              | $y_i = 0$ | $y_i = 1$ |
|------------------------------|-----------|-----------|
| $s^{(i+1)} = A \wedge x_i = 0$ | A         | A         |
| $s^{(i+1)} = B \wedge x_i = 0$ | B         | B         |
| $s^{(i+1)} = U \wedge x_i = 0$ | U         | B         |
| $s^{(i+1)} = A \wedge x_i = 1$ | A         | A         |
| $s^{(i+1)} = B \wedge x_i = 1$ | B         | B         |
| $s^{(i+1)} = U \wedge x_i = 1$ | A         | U         |

If $y_i=0$, then Bob should choose the left column, otherwise he should use the right column.

(b) Alice uses $OT_1^6$ with $s^{(i+1)}$ and $x_i$ as indices to obtain $s^{(i)} = z^{(i)}(s^{(i+1)}, x_i)$.
5. Bob sends Alice the meaning of the three states of $s^{(1)}$ of the least significant bit. Alice now knows which number is larger.

The above described basic, well known secure protocols are now used to describe the secure classification of private data.

Private Information Classification

FIG. 1 shows the steps of one embodiment of the invention.

Secure Threshold Classifier

Input: Alice has input data vector x, and Bob has a strong classifier $$H(x) = \text{sign}\left(\sum_{n=1}^{N} h_n(x^T y_n)\right),$$

where $$h_n(x) = \begin{cases} \alpha_n & x^T y_n > \Theta_n \\ \beta_n & \text{otherwise} \end{cases}$$

is a weak classifier, $a_n$, $\beta_n$ and $\Theta_n$ are scalar values, e.g., 1 and 0, that are learned during training.

The vector $y_n$ stores the parameters of Bob's classifier which Bob 'learns' using conventional training methods, such as decision trees, Bayesian networks, support vector machines (SVM), and neural networks.

Output: Alice obtains the result sign(H(x)) and nothing else, and Bob learns nothing about the data x.

1. Alice provides data x 101, and Bob provides N threshold classifiers $h_n(X)$, each with hyperplane $y_n$ 102. Bob also generates 110 a set of N random numbers: $s_1, \ldots, s_N$, such that $$s = \sum_{n=1}^{N} s_n.$$

2. For each n=1, ..., N, Alice and Bob perform the following sub-steps:
   (a) Alice and Bob obtain private shares $a_n$ 121 and $b_n$ 122, respectively, of the dot product $x^T y_n$ 120 using the secure dot-product protocol.
   (b) Alice and Bob use the secure millionaire protocol to determine 130 which number is larger: $a_n$ or $\Theta_n - b$. Instead of returning $a_n$ or $\beta_n$, the protocol returns as a result 131 either $a_n + s_n$, or $\beta_n + s_n$
   (c) Alice stores the result in $c_n$ 132.
3. Alice and Bob use the secure millionaire protocol to determine 140 which of the numbers $$c = \sum_{n=1}^{N} c_n \text{ or } s = \sum_{n=1}^{N} s_n$$

is larger. The result is a sign 103. If Alice has a larger number, then x is classified positively, otherwise x is classified negatively.

Secure Polynomial Kernel Classifier

Figure 2:
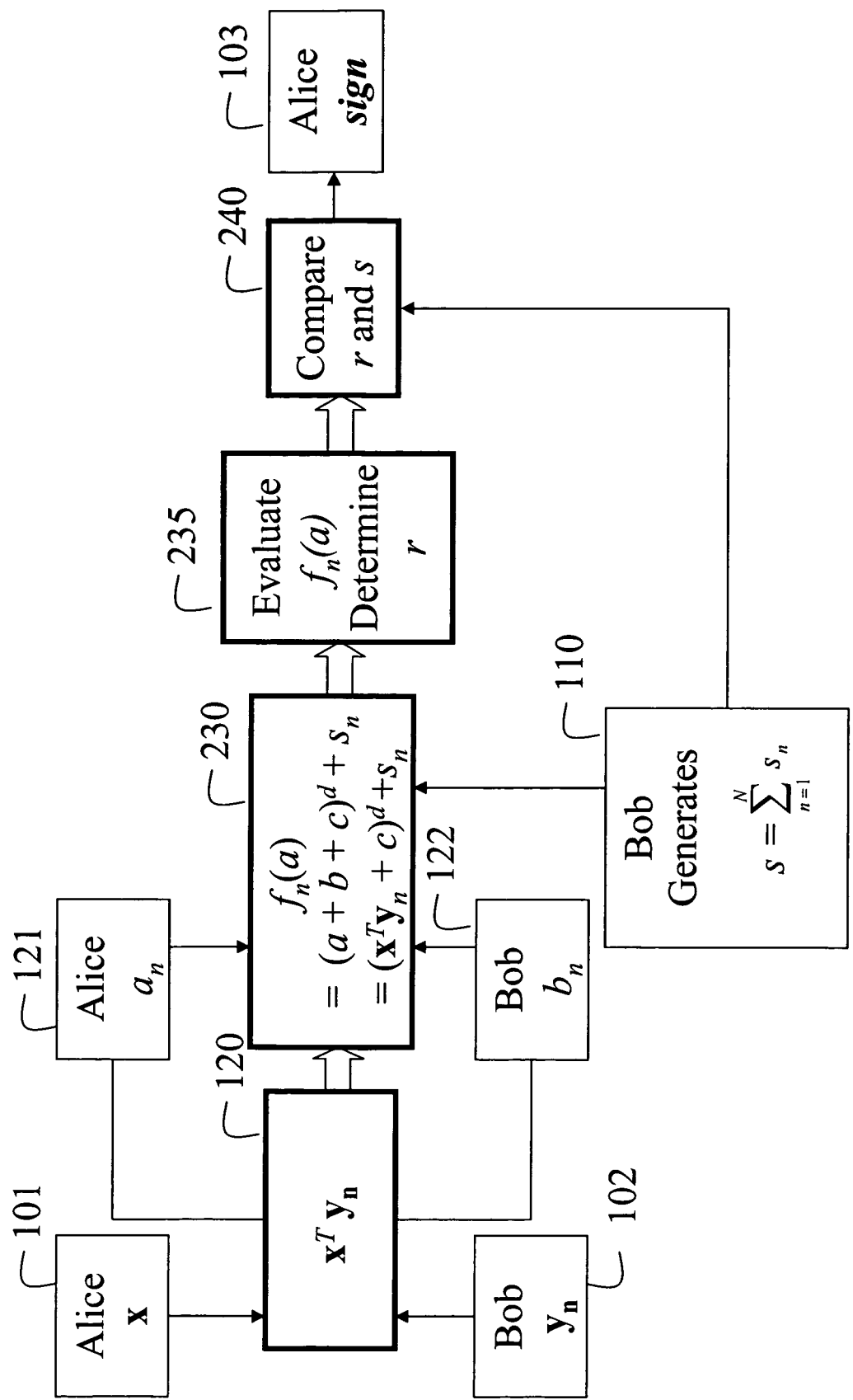
FIG. 2 is a flow diagram for classifying private data using a secure polynomial classifier according to an embodiment of the invention.

FIG. 2 shows the steps of one embodiment of the invention.

Input: Alice has data x, and Bob has the classifier $$H(x) = \text{sign}\left(\sum_{n=1}^{N} h_n(x)\right),$$

where $h(x^T y) = (x^T y + c)^d$, where c and d are parameters known only to Bob.

Output: Alice has the result sign(H(x)) and nothing else, and Bob learns nothing about the data x.

1. Alice provides data x 101, and Bob provides N polynomial classifiers $h_n(X)$, each with hyperplane $y_n$ 102. Bob generates 110 a set of N random numbers: $s_1, \ldots, s_N$, such that $$s = \sum_{n=1}^{N} s_n.$$

2. For each n=1, ..., N, Alice and Bob perform the following sub-steps:

(a) Alice and Bob obtain private shares $a_n$ 121 and $b_n$ 122, respectively, of the dot product $x^T y_n$ 120, using the secure dot-product protocol.
(b) Bob constructs 230 a polynomial $f_n(a) = (a_n + b_n + c)^d + s_n = (x^T y_n + c)^d + s_n$.
(c) Alice and Bob use the OPE protocol to evaluate and determine 235 $f_n(a)$ and $$r = \sum_{n=1}^{N} f_n(a_n).$$

3. Alice and Bob use the secure millionaire protocol to determine 240 which number is larger: r or s. If Alice has a larger number, then x is classified positively, otherwise x is classified negatively.

Secure Gaussian Kernel Classifier

Figure 3:
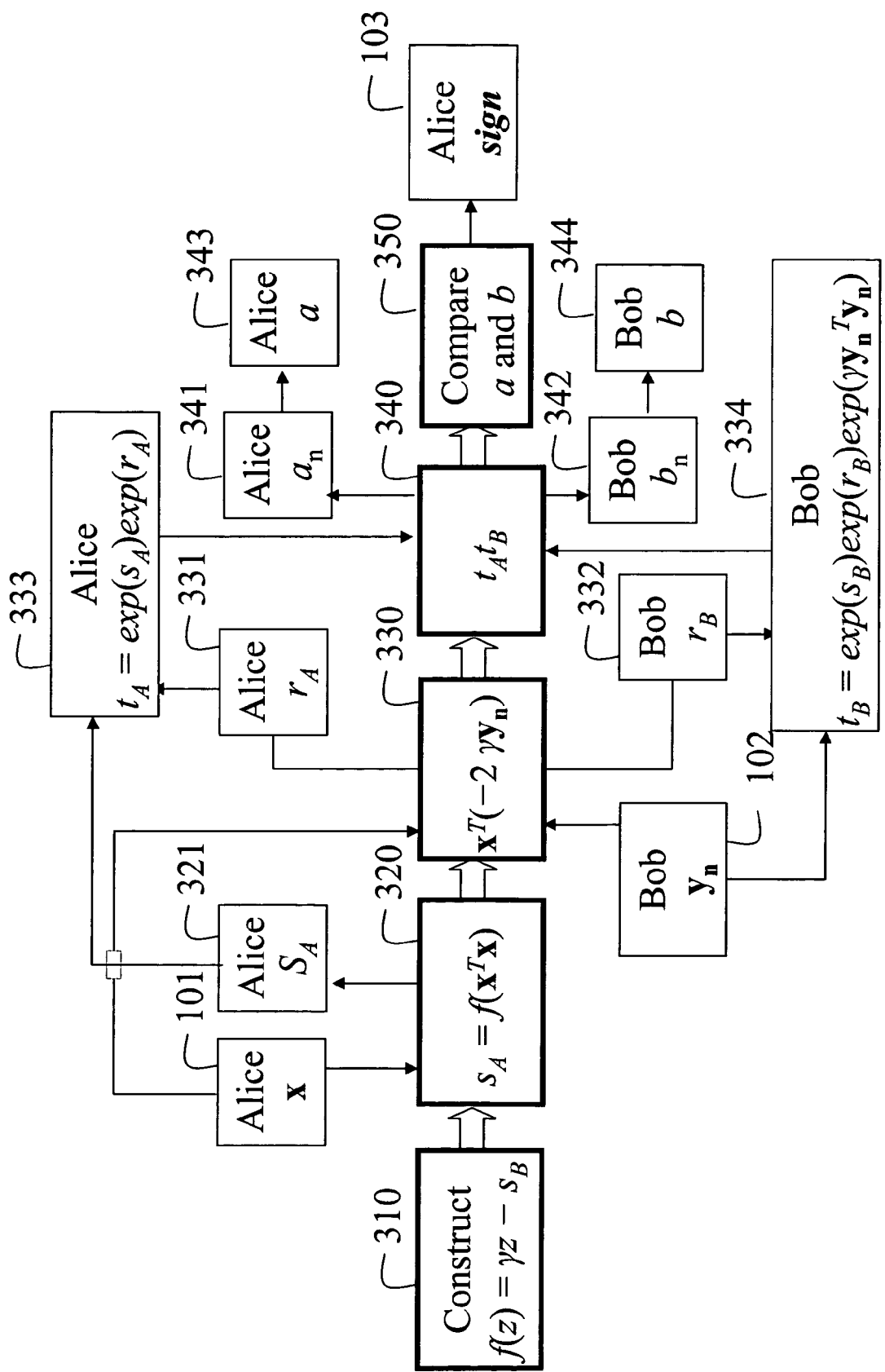
FIG. 3 is a flow diagram for classifying private data using a secure Gaussian function classifier according to an embodiment of the invention.
Figure 4:
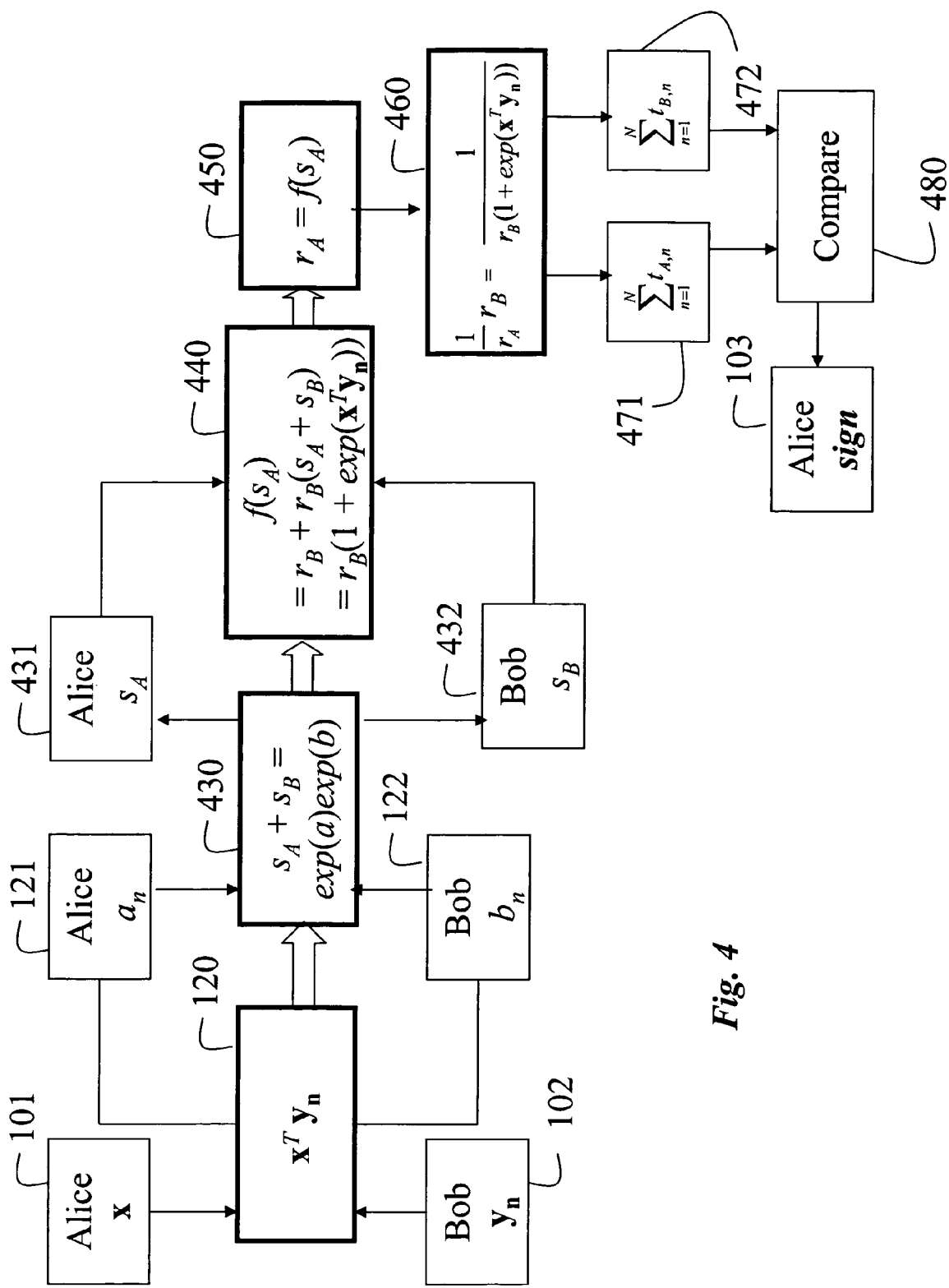
FIG. 4 is a flow diagram for classifying private data using a secure sigmoid classifier according to an embodiment of the invention.

FIG. 3 shows the steps of one embodiment of the invention.

Input: Alice has input data x, and Bob has the classifier $$H(x) = \text{sign}\left(\sum_{n=1}^{N} h_n(x)\right),$$

where $h_n(x^T y) = \exp(\gamma \|x-y\|_2^2)$, a norm 2 or Euclidian distance, and $\gamma$ is a scalar learned by Bob during training.

Output: Alice obtains the result sign(H(x)) and nothing else, and Bob learns nothing about the data x.

1. Alice provides data x 101, Bob provides N polynomial classifiers $h_n(x)$, each with hyperplane $y_n$ 102.
2. For each n=1, ..., N, Alice and Bob conduct the following sub-steps:
   (a) Bob selects a random number $s_B$ and constructs 310 a function $f(z) = \gamma z - s_B$, where z is a scalar.
   (b) Alice and Bob use OPE to obtain 320 a share $s_A$ 321 for Alice, where $s_A = f(x^T x)$, a secure dot product.
   (c) Alice and Bob obtain 330 shares $r_A$ 331 and $r_B$ 332, respectively, of the dot product $x^T(-2\gamma y_n)$, using the secure dot-product protocol.
   (d) Alice constructs $t_A = \exp(s_A)\exp(r_A)$ 333.
   (e) Bob constructs $t_B = \exp(s_B)\exp(r_B)\exp(\gamma y_n^T y_n)$ 334.
   (f) Alice and Bob obtain 340 private shares $a_n$ 341 and $b_n$ 342 of the dot product $t_A t_B = \exp(s_A + r_A + s_B + r_B + \gamma y_n^T y_n) = \exp(\gamma \|x - y_n\|_2^2)$, using the secure dot-product protocol.
3. Alice determines an accumulation $$a = \sum_{n=1}^{N} a_n \text{ 343,}$$

and Bob determines an accumulation $$b = \sum_{n=1}^{N} b_n \text{ 344.}$$

4. Alice and Bob use the secure millionaire protocol to determine 350 the sign 103 that indicates which number is larger: a or b. If Alice has a larger number then x is classified positively, otherwise x is classified negatively.

Secure Sigmoid Kernel Classifier

Input: Alice has data x 101, and Bob has the classifier $$H(x) = \text{sign}\left(\sum_{n=1}^{N} h_n(x)\right),$$

where $h(x^T y) = 1/(1+\exp(x^T y))$.

Output: Alice has the result sign(H(x)) and nothing else, and Bob learns nothing about the data x.

1. For each n=1, . . . , N, Alice and Bob perform the sub-steps:
   (a) Alice and Bob obtain 120 shares $a_n$ 121 and $b_n$ 122, respectively, of the dot product $x^T y_n$ using the secure dot-product protocol, where $y_n$ 102 is a vector supplied by Bob, as before.
   (b) Alice and Bob determine 430 private shares $s_A$ 431 and $s_B$ 432 such that $s_A + s_B = \exp(a)\exp(b)$ using the secure dot-product protocol.
   (c) Bob selects $r_B$ at random, and defines 440 $f(s_A) = r_B + r_B(s_A + s_B) = r_B(1+\exp(x^T y_n))$.
   (d) Alice and Bob use OPE to determine 450 $r_A = f(s_A)$.
   (e) Alice and Bob determine 460 shares $t_{A,n}$ and $t_{B,n}$ of the dot-product $$\frac{1}{r_A} r_B = \frac{1}{r_B(1+\exp(x^T y_n))}$$

using the dot-product protocol.

2. Alice determines $$t_A = \sum_{n=1}^{N} t_{A,n} \mathbf{471}.$$

3. Bob determines $$t_B = \sum_{n=1}^{N} t_{B,n} \mathbf{472}.$$

4. Alice and Bob use the secure millionaire protocol to determine 480 the sign 103 that indicates which number is larger: $t_A$ or $-t_B$. If Alice has a larger number, then x is classified positively, otherwise x is classified negatively.

Secure k-nn Classifier

This protocol is a secure realization of a k-nn classifier. Alice has data x. Bob has points $\{y_i\}_{i=1}^{N}$ with associated labels $c(y_i)$. Given the data x, the object is to find the label of the majority of the k vectors $y_i$ that are nearest to the data x. Here, we focus on a binary classification. Alice and Bob have additive shares of a radial distance r, such that within the distance r, there are exactly k points $y_{i_1}, \ldots, y_{i_k}$.

Alice and Bob can use a radius protocol, described below, to privately count the number of values and use their labels to privately determine correct label for the data x. However, the k-nn classifier is defined in terms of k and not the radius r, so we provide a protocol that can determine the radius r, given k.

To do this, we define $r_k$ to be the radius of the $k^{th}$ furthest point from the data x, and describe how to find $r_k$, given k. After the radius $r_k$ is obtained, we can determine the label of x. We assume that Alice and Bob can determine private shares of a squared Euclidean distance $d(x, y_i)$ between the point x and any of the points $y_i$ using the secure dot-product protocol discussed earlier.

The basic steps of the methods are shown in FIG. 5 in terms of pseudo code.

Input: Alice has input data x and a private share $r_A$ of a radius r, and Bob has points $y_i$ and a private share, $r_B$ of the radius r.

Output: Alice learns a classification label of x, and nothing else, and Bob learns nothing.

1. For each point $y_i$, Alice and Bob perform the following sub steps:
   (a) Alice and Bob obtain private shares a and b of the dot product $(-2x)^T y$.
   (b) Bob defines $s_B = b + y^T y$ and a function $f(z) = z + s_B$.
   (c) Alice and Bob use OPE to evaluate $s_A = f(x^T x + a)$, where $s_A$ is a private share of Alice.
   (d) Bob selects $u_i$ at random.
   (e) Alice and Bob compare $s_A - r_A$ to $r_B - s_B$ using the millionaire protocol. This is equivalent to comparing the squared Euclidean distance $d(x, y_i)$ to the radius r. If $s_A - r_A < r_B - s_B$ AND $c(y_i) = 1$, then Bob returns $u_i + 1$, otherwise Bob returns $u_i$. Alice stores the result in $v_i$.

2. Alice and Bob determine $$v = \sum_{i=1}^{N} v_i$$

and $$u = \sum_{i=1}^{N} u_i,$$

respectively.

3. Alice and Bob compare v and u+k/2 using the millionaire protocol. If v>u+k/2, then x is labeled 1, otherwise the label is 0.

Radius Protocol

Input: Alice has input data x, and Bob has a list of points $y_i$ and a value k.

Output: Alice has a share $r_A$ of the radius r of k nearest neighbors of x, and Bob has a share $r_B$, such that the radius $r = r_A + r_B$. Bob learns nothing about the data x.

1. Alice and Bob select randomly $r_A$ and $r_B$, respectively.
2. Do, until termination:
   (a) For each point $y_i$, Alice and Bob perform the following sub-steps:
      i. Alice and Bob obtain shares a and b of the dot product $(-2x)^T y_i$.
      ii. Bob defines $s_B = b + y_i^T y_i$ and a function $f(z) = z + s_B$.
      iii. Alice and Bob use OPE to evaluate $s_A = f(x^T x + a)$, where $s_A$ is a private share of Alice.
      iv. Bob selects $u_i$ at random.
      v. Alice and Bob use the millionaire protocol to compare $s_A - r_A$ to $r_B - s_B$. This is equivalent to comparing the squared Euclidean distance $d(x, y_i)$ to r. If $s_A - r_A < r_B - s_B$, then Bob return $u_i + 1$, otherwise Bob returns $u_i$. Alice stores the result in $v_i$.

(b) Alice and Bob determine $$v = \sum_{i=1}^{N} v_i$$

and $$u = \sum_{i=1}^{N} u_i,$$

respectively.
(c) Alice and Bob use the millionaire protocol to compare v to u+k and do the following:
   i. If v>u+k, then r is too large, and either Alice decreases $r_A$ by 1 or Bob decreases $r_B$ by 1, and repeat.
   ii. If v<u+k, then r is too small, and either Alice increases $r_A$ by 1, or Bob increases $r_B$ by 1, and repeat.
   iii. If v=u+k, terminate.

EFFECT OF THE INVENTION

The invention provides a method for classifying private information using various dot product based classifiers, such as support vector machines (SVM), neural-networks, Ada-Boost, and k-nn classifiers.

It is to be understood that various other adaptations and modifications may be made within the spirit and scope of the invention. Therefore, it is the object of the appended claims to cover all such variations and modifications as come within the true spirit and scope of the invention.

We claim:
1. A method for securely classifying private data of a first party using a classifier H(x) of a second party, comprising a client and a server for performing steps of the method, comprising the steps of:
   (1) providing, using the client, private data of a first party as a vector x, and providing, using the server, a classifier

$$H(x) = \text{sign}\left(\sum_{n=1}^{N} h_n(x)\right)$$

by a second party, where $$h_n(x) = \begin{cases} \alpha_n & x^T y_n > \Theta_n \\ \beta_n & \text{otherwise} \end{cases}; \alpha_n, \beta_n$$

and $\Theta_n$ are
   scalar values; and $y_n$ is a vector storing parameters of the classifier, and generating, by the second party, a set of N random numbers, $s_1, \ldots, s_N$, such that $$s = \sum_{n=1}^{N} s_n;$$

(2) performing, for each n=1, ..., N, the sub-steps:
   (a) applying a secure dot product to $x^T y_n$ to obtain $a_n$ for the first party and $b_n$ for the second party;
   (b) applying a secure millionaire protocol to determine whether $a_n$ is larger than $\Theta_n - b_n$, and returning a result of $a_n + s_n$ or $\beta_n + s_n$;
   (c) accumulating, by the first party, the result in $c_n$; and
(3) applying the secure millionaire protocol to determine whether $$c = \sum_{n=1}^{N} c_n$$

is larger than $$s = \sum_{n=1}^{N} s_n,$$

and returning a positive sign if true, and a negative sign if false to classify the private data x, wherein the providing, the performing, and the applying steps are performed in part by the client and in part by the server using secure multi-party protocols.

2. The method of claim 1, in which H(x) is a strong classifier that is a linear combination of weak classifiers h(x).

3. A method for securely classifying private data of a first party using a classifier H(x) of a second party, comprising a client and a server for performing steps of the method, comprising the steps of:
   (1) providing private data of a first party as a vector x, and providing a classifier $$H(x) = \text{sign}\left(\sum_{n=1}^{N} h_n(x)\right)$$

by a second party, where $h_n(x^T y_n) = (x^T y_n + c)^d$, where c and d are scalar values, and $y_n$ is a vector storing parameters of the classifier, and generating, by the second party, a set of N random numbers, $s_1, \ldots, s_N$, such that $$s = \sum_{n=1}^{N} s_n;$$

(2) performing, for each n=1, ..., N, the sub-steps:
   (a) applying a secure dot product to $x^T y_n$ to obtain $a_n$ for the first party and $b_n$ for the second party;
   (b) constructing, by the second party, a polynomial $f_n(a) = (a+b+c)^d + s_n = (x^T y_n + c)^d + s_n$;
   (c) applying an oblivious polynomial evaluation to $f_n(a)$;
(3) determining, by the first party, $$r = \sum_{n=1}^{N} f_n;$$

(4) applying the secure millionaire protocol to determine whether r is larger than s, and returning a positive sign if true, and a negative sign if false to classify the private data x, wherein the providing, the performing, the determining and the applying steps are performed in part by the client and in part by the server using secure multi-party protocols.

4. A method for securely classifying private data of a first party using a classifier H(x) of a second party, comprising a client and a server for performing steps of the method, comprising the steps of:

(1) providing private data of a first party as a vector x, and providing a classifier $$H(x) = \text{sign}\left(\sum_{n=1}^{N} h_n(x)\right)$$

by a second party, where $h_n(x^T y) = \exp(\gamma \|x - y_n\|_2^2)$, and y is a vector storing parameters of the classifier and generating, by the second party, a set of N random numbers, $s_1, \ldots, s_N$, such that $$s = \sum_{n=1}^{N} s_n;$$

(2) performing, for each n=1, ..., N, the sub-steps:
(a) selecting, by the second party, a random number $s_B$ and constructing a function $f(z) = \gamma z - s_B$, where z is a scalar.
(b) applying oblivious polynomial evaluation to obtain a share $s_A$ for the first party, where $s_A = f(x^T x)$ is a secure dot product;
(c) applying the secure dot product to $x^T(-2\gamma y_n)$ to obtain a share $r_A$ for the first party and a share $r_B$ for the second party;
(d) constructing, by the first party, $t_A = \exp(s_A)\exp(r_A)$;
(e) constructing, by the second party, $t_B = \exp(s_B)\exp(r_B)\exp(\gamma y_n^T y_n)$;
(f) applying the secure dot product to $t_A t_B = \exp(s_A + r_A + s_B + r_B + \gamma y_n^T y_n) = \exp(\gamma \|x - y_n\|_2^2)$ to obtain $a_n$, for the first party and $b_n$ for the second party;

(3) determining an accumulation $$a = \sum_{n=1}^{N} a_n$$

for the first party, and an accumulation $$b = \sum_{n=1}^{N} b_n$$

for the second party;

(4) applying the secure millionaire protocol to determine whether a is larger than b, and returning a positive sign if true, and a negative sign if false to classify the private data x, wherein the providing, the performing, the determining and the applying steps are performed in part by the client and in part by the server using secure multi-party protocols.

5. A method for securely classifying private data of a first party using a classifier H(x) of a second party, comprising a client and a server for performing steps of the method, comprising the steps of:

(1) providing private data of a first party as a vector x, and providing a classifier $$H(x) = \text{sign}\left(\sum_{n=1}^{N} h_n(x)\right)$$

by a second party, where $h_n(x^T y_n) = 1/(1 + \exp(x^T y_n))$, and $y_n$ is a vector storing parameters of the classifier;

(2) performing, for each n=1, ..., N, the sub-steps:
(a) applying a secure dot product to $x^T y_n$ to obtain private shares $a_n$ for the first party and $b_n$ for the second party;
(b) applying the secure dot product to $s_A + s_B = \exp(a)\exp(b)$ to obtain $s_A$ for the first party and $s_B$ for the second party;
(c) selecting, by the second party, a random number $r_B$, and defining $f(s_A) = r_B + r_B(s_A + s_B) = r_B(1 + \exp(x^T y_n))$;
(d) applying an oblivious polynomial evaluation to obtain $r_A = f(s_A)$ for the first party;
(e) applying the secure dot product to $$\frac{1}{r_A} r_B = \frac{1}{r_B(1 + \exp(x^T y_n))}$$

to obtain $t_{A,n}$ for the first party and $t_{B,n}$ for the second party;

(3) determining $$t_A = \sum_{n=1}^{N} t_{A,n}$$

by the first party, and $$t_B = \sum_{n=1}^{N} t_{B,n}$$

by the second party; and (4) applying the secure millionaire protocol to determine whether $t_A$ is larger than $-t_B$, and returning a positive sign if true, and a negative sign if false to classify the private data x, wherein the providing, the performing, the determining and the applying steps are performed in part by the client and in part by the server using secure multi-party protocols.

6. A method for securely classifying private data of a first party, comprising a client and a server for performing steps of the method, comprising the steps of:

(1) providing a private data vector x, a private share $r_A$ of a radius r of a first party, and points $y_i$ and a private share $r_B$ of the radius r of a second party;

(2) performing by the first party and the second party for each point $y_i$ the sub steps:

(a) obtaining by the first party and the second party private shares a and b, respectively, of the dot product $(-2x)^T y$;

(b) defining by the second party $s_B = b + y^T y$ a function $f(z) = z + s_B$, where z is a scalar;

(c) applying an oblivious polynomial evaluation to evaluate $s_A = f(x^T x + a)$, where $s_A$ is a private share of the first party;

(d) selecting by the second party a random number $u_i$;

(e) comparing $s_A - r_A$ to $r_B - s_B$ using a millionaire protocol, and if $s_A - r_A < r_B - s_B$ AND $c(y_i) = 1$, returning $u_i + 1$, and otherwise the second party returns $u_i$. The first party stores the result in $v_i$;

(3) determining $$v = \sum_{i=1}^{N} v_i$$

and $$u = \sum_{i=1}^{N} u_i$$

by the first party and the second party, respectively;

(4) comparing v and u+k/2 using the millionaire protocol, and if v>u+k/2, then x is labeled as 1, otherwise as 0, wherein the providing, the performing, the determining and the comparing steps are performed in part by the client and in part by the server using secure multi-party protocols.

* * * * *